United States Patent [19]

Shirai et al.

[11] Patent Number: 5,343,372
[45] Date of Patent: Aug. 30, 1994

[54] VEHICULAR HEADLAMP ASSEMBLY

[75] Inventors: Katutada Shirai; Hideharu Mochizuki; Hironori Tsukamoto, all of Shizuoka, Japan

[73] Assignee: Koito Manufacturing Co., Ltd., Tokyo, Japan

[21] Appl. No.: 13,804

[22] Filed: Feb. 4, 1993

[30] Foreign Application Priority Data

Apr. 3, 1992 [JP] Japan .................... 4-082128
Jul. 13, 1992 [JP] Japan .................... 4-184995
Jul. 24, 1992 [JP] Japan .................... 4-198215

[51] Int. Cl.$^5$ ............................. B60Q 1/06
[52] U.S. Cl. ...................... 362/66; 362/80; 362/284; 362/428; 33/288
[58] Field of Search ........... 362/61, 66, 80, 282, 362/284, 427, 428; 33/288

[56] References Cited

U.S. PATENT DOCUMENTS

| | | | |
|---|---|---|---|
| 1,632,127 | 6/1927 | Goodstein | 362/284 |
| 2,913,825 | 11/1959 | MacMillan | 33/288 |
| 4,628,414 | 12/1986 | Ricard | 362/61 |
| 4,870,544 | 9/1989 | Iwamoto | 362/428 |
| 5,032,964 | 7/1991 | Endo et al. | 362/66 |
| 5,065,293 | 11/1991 | Mochizuki | 362/61 |
| 5,068,769 | 11/1991 | Umeda et al. | 362/61 |
| 5,077,642 | 12/1991 | Lisak | 362/66 |
| 5,121,303 | 6/1992 | Shirai et al. | 362/66 |
| 5,197,794 | 3/1993 | Scott et al. | 362/80 |
| 5,197,799 | 3/1993 | Dehaene | 362/284 |

Primary Examiner—Richard A. Bertsch
Assistant Examiner—Michael Kocharov
Attorney, Agent, or Firm—Sughrue, Mion, Zinn, Macpeak & Seas

[57] ABSTRACT

A vehicular headlamp assembly with a tilt measuring device of small height, which is difficult to damage, requires a decreased number of parts, and is easy to assemble. The tilt measuring device is interposed between a protruding portion of a horizontal aiming screw protruding rearward of a reference member and the reference member. The tilt measuring device includes a fixed holder fixed to the reference member and covering the protruding portion of the horizontal aiming screw protruding rearward of the reference member, an elongated groove being formed in said fixed holder extending parallel to the horizontal aiming screw. A slidable nut member is received in the fixed holder in such a manner as to be longitudinally slidable relative to the fixed holder. The nut member threadedly engages the protruding portion of the horizontal aiming screw. A portion of the nut member is exposed through the elongated groove of the fixed holder. A scale cooperates with the portion of the nut member exposed through the elongated groove for indicating the amount of displacement of the nut member relative to the fixed holder.

27 Claims, 12 Drawing Sheets

VEHICULAR HEADLAMP ASSEMBLY

BACKGROUND OF THE INVENTION

The present invention relates to a vehicular headlamp assembly provided with a measuring device for checking the aiming directions of right and left light beams of the headlamp to determine whether or not the angle between the right and left light beams is properly set. More particularly, the invention relates to a vehicular headlamp assembly which can easily adjust the angle between the right and left light beams, when not properly set, to the correct angle.

A headlamp apparatus of the tiltable reflector type in which a reflector is tiltably supported in a headlamp body will be described as an example of a vehicular headlamp assembly to which the invention can be applied. As shown in FIG. 1, a reflector b is mounted on its rear surface to a lamp body a by means of two aiming screws c and d, which extend in the front-to-rear direction of the headlamp, and a pivot e. In FIG. 1, in which the reflector is seen from the front side, the aiming screws c and d extend vertically with respect to the plane of the drawing.

The aiming screws c and d are rotatably supported on the rear side of the lamp body a. The support points of the reflector b supported by the aiming screws c and d are orthogonal to the pivot e as seen from the front of the headlamp. The reflector b can be tilted about a horizontal axis $L_x$ and a vertical axis $L_y$ by turning the aiming screws c and d, whereby the angle between the two light beams is adjusted. Reference character f designates a bulb as a light source mounted on the reflector b.

There is known another headlamp apparatus of the tiltable unit type in which a lamp body reflector unit is tiltable about a lamp housing. The lamp body reflector unit is constructed such that the reflector is integral with the spherical inner surface of the lamp body. The tiltable unit headlamp apparatus, like the tiltable reflector headlamp apparatus, is constructed such that the lamp body reflector unit is supported on the lamp housing by means of one pivot and two aiming screws. The light beam angle of the headlamp is adjusted by adjusting the tilt angle of the reflector unit. In this case, the reflector unit is tilted by turning the aiming screws.

As described above, in the conventional vehicular headlamp apparatuses, the light beam angle of the headlamp is adjusted in a such a manner that the tilting member (the reflector in the tiltable reflector headlamp apparatus and the lamp-body/reflector unit in the tiltable unit headlamp apparatus), the orientation of the reflecting surface of which determines the light beam direction, is tilted horizontally (about the vertical axis) and vertically (about the horizontal axis) with respect to the reference member (the lamp body in the tiltable reflector headlamp apparatus and the lamp housing in the tiltable unit headlamp apparatus).

Many proposals have been made for the measuring device for measuring the horizonal light beam angle of the headlamp in a simple manner. U.S. Pat. Nos. 5,138,532, 5,121,303, and 5,029,051, all commonly assigned herewith, disclose several examples.

In all of those proposals, the measuring device for measuring the horizontal tilt of the tilting member is installed between the tilting member and the reference member. Further, it is frequently placed at a location above the lamp for ease of reading the scale. This results in increasing the height of the headlamp. The increased height is contradictory to the recent market trend for flat-type headlamps. Particularly, in the tiltable reflector headlamp apparatus, the measuring device is located within the lamp body. This construction makes it difficult to read the scale.

A tilt measuring device, such as disclosed in U.S. Pat. No. 5,121,303, is illustrated in FIG. 2. As shown therein, a transparent case g protrudes from the rear side of a lamp body a. The first half of a sliding bar h is slidably located in the transparent case g. The second half thereof extends through the lamp body a and resiliently contacts the rear side (side bracket) of the reflector b. A relative scale is provided between the rear end h1 of the sliding bar h and the transparent case g. The amount of the horizontal tilt of the reflector b is measured on the basis of the displacement of the sliding bar h relative to the transparent case g. Reference symbol i designates a compression coiled spring.

In the measuring device structure of FIG. 2, a hole through which the sliding bar h passes must be formed in the lamp body a as the reference member. The work to form the hole in the lamp body is troublesome in production. Further, careful adjustment is required when the measuring device is assembled into the lamp body.

A tilt measuring device previously proposed by the present applicant is shown in FIG. 3. As shown, a guide member 101 protrudes from the rear side of a lamp body a. A slide case 102, coupled with the guide member 101, is slidable in the direction of the guide member extension. A nut 103, which receives a horizontal aiming screw c, is slidable within the slide case 102. A zero-adjustment screw 104 is interposed between the nut 103 and the slide case 102.

In operation, an indicator 106 between the guide member 101 and the slide case 102 is preset to indicate a zero point 105a on the scale 105. When the reflector tilts in the horizontal direction, the indicator 106 moves to indicate the amount of tilt of the reflector. The indicator 106 is adjusted to point to the zero point 105a by turning the zero-adjustment screw 104. As seen, in this technique, the measuring device for measuring the horizontal tilt of the light beam angle of the headlamp is assembled into the section protruding from the lamp body a. Accordingly, there is no need of the troublesome work to form a hole for the measuring device. Further, the height of the headlamp can be reduced.

In the case of the measuring device of FIG. 3, the guide member 101, which is shaped like a bar and has a scale formed thereon, is thin. Accordingly, when the headlamp is mounted on the car body or the aiming or zero adjustment is carried out, if a worker mistakenly hits the guide member with a tool such as a driver or wrench, the guide member can be easily damaged or broken.

Additionally, the conventional measuring devices require a great number of parts and a complicated construction. Accordingly, the cost of manufacture is high and the assembly work of the measuring device to the headlamp is complicated.

SUMMARY OF THE INVENTION

Accordingly, the present invention has an object to provide a vehicular headlamp assembly with a tilt measuring device of small height and which is difficult to damage.

Another object of the present invention is to provide a tilt measuring device for a vehicular headlamp assembly requiring a decreased number of parts and which is easy to assemble.

To achieve the above and other objects, there is provided a vehicular headlamp assembly of the tilting member type in which a tilting member, including a reflecting surface which determines the aiming direction of the headlamp, is supported at three support points, namely, a support point pivotally supported at a reference member, a horizontal aiming screw, and a vertical aiming screw. Both the aiming screws are supported at the reference member, and the light beam angle of the headlamp is adjusted in a such a manner that the tilting member is horizontally and vertically tilted with respect to the reference member. In accordance with the invention, a tilt measuring device for measuring a tilt of the tilting member in the horizontal direction is interposed between a protruding portion of the horizontal aiming screw protruding rearward of the reference member and the reference member, the tilt measuring device comprising:

a fixed holder, which is U-shaped in cross section and is fixed to the reference member, for covering the portion of the horizontal aiming screw protruding rearward of the reference member;

a nut holder, which is U-shaped in cross section and is received in the fixed holder, the nut holder being slidable along an elongated groove formed in the fixed holder and extending parallel with the extension of the aiming screw;

nut means mounted in the nut holder and longitudinally slidable relative to the nut holder, the nut means engaging the portion of the horizontal aiming screw protruding rearward of the reference member;

a scale for indicating the amount of displacement of the nut holder relative to the fixed holder, the scale being provided at a predetermined location at an exposed portion of the nut holder exposed through the elongated groove of the fixed holder; and a zero-adjustment screw screwed into a female screw part of the nut holder and a female part of the nut means, both being formed in a relative slide path of the nut holder and the nut means, such that, when the zero-adjustment screw is turned, the nut holder is slid along the elongated groove of the fixed holder.

The tilt measuring device thus constructed may be applied to a tiltable reflector vehicular headlamp and to a tiltable unit vehicular headlamp as well.

When the horizontal aiming screw is turned, the tilting member tilts with respect to the reference member (tilts about a vertical axis), and the nut means moves forward or backward along the nut holder. However, the nut means and the nut holder are coupled in one-piece construction and move along the elongated groove in unison since the nut means is threaded around the longitudinally extending zero-adjustment screw. The amount of tilt of the tilting member with respect to the reference member when the horizontal aiming screw is turned (the amount of movement of a support point where the tilting member is supported by the aiming screw, along the aiming screw) is proportional to the amount of movement of the nut holder relative to the fixed holder. The amount of tilt of the tilting member with respect to the reference member, i.e., the amount of horizontal deviation of the light beam angle of the headlamp, appears as a change of the reading on the scale between the nut holder, which is longitudinally fixed to the nut means threaded around the aiming screw through the zero-adjust screw, and the fixed holder fixed to the reference member and extending rearwardly. Therefore, one can know from the reading change whether or not the horizontal light beam angle of the headlamp is proper, and if it is not proper, the amount of its deviation. The deviation can be zeroed by turning the horizontal aiming screw.

When the zero-adjustment screw is turned, the nut means and the nut holder will relatively and longitudinally slide. However, the nut means is locked since the nut means is threaded around the aiming screw extending forward and rearward. Accordingly, when the zero-adjustment screw is turned, the nut holder slides forward and backward along the elongated groove of the fixed holder, thereby effecting the zero adjustment.

The tilt measuring device is interposed between the protruding portion of the aiming screw, which protrudes rearwardly, and the reference member. Therefore, there is no need of forming an opening through which a slider as shown in FIG. 2 passes. With arrangement of the tilt measuring device disposed on the rear side of the reference member, a headlamp of low height can be realized.

The tilt measuring device has no thick guide member as in the structure previously proposed. Accordingly, the tilt inventive measuring device will not be damaged or broken by such tools as screwdrivers or wrenches.

BRIEF DESCRIPTION OF THE DRAWINGS

Other objects, advantages, and features of the present invention will be apparent when carefully reading the following detailed description in connection with the accompanying drawings, in which.

DESCRIPTION OF THE PREFERRED EMBODIMENTS

Specific embodiments of the invention now will be described with reference to the accompanying drawings.

FIGS. 4 through 12 together show a first embodiment of a tilt measuring device constructed according to the present invention when the invention is applied to a tiltable reflector vehicular headlamp assembly where the reference member is a lamp body and the tilting member is a reflector.

Figure 1:
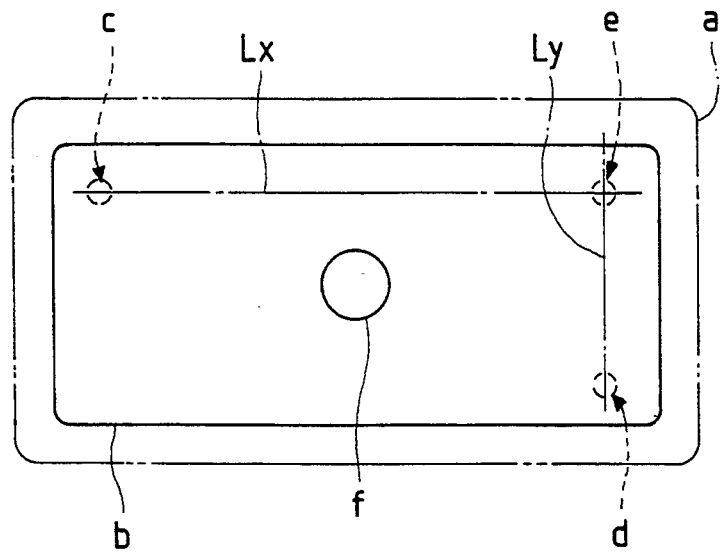
FIG. 1 is a schematic rear elevation of a conventional tiltable reflector vehicular headlamp assembly.
Figure 2:
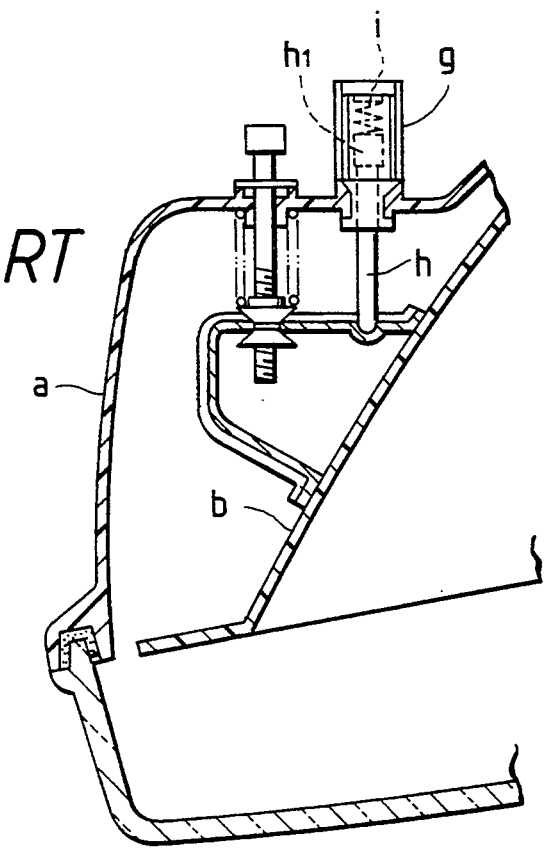
FIG. 2 is a cross-sectional view showing a part of a conventional vehicular headlamp assembly provided with a tilt measuring device.
Figure 3:
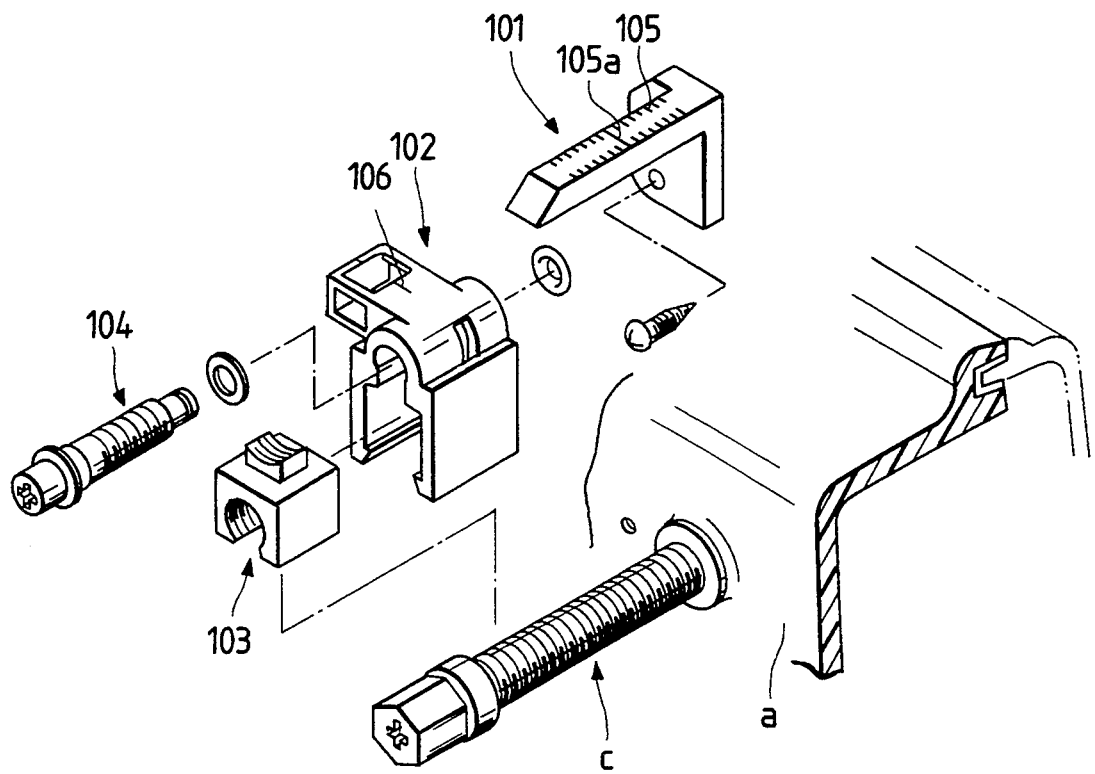
FIG. 3 is a schematic rear elevation of another conventional tiltable unit vehicular headlamp assembly.
Figure 4:
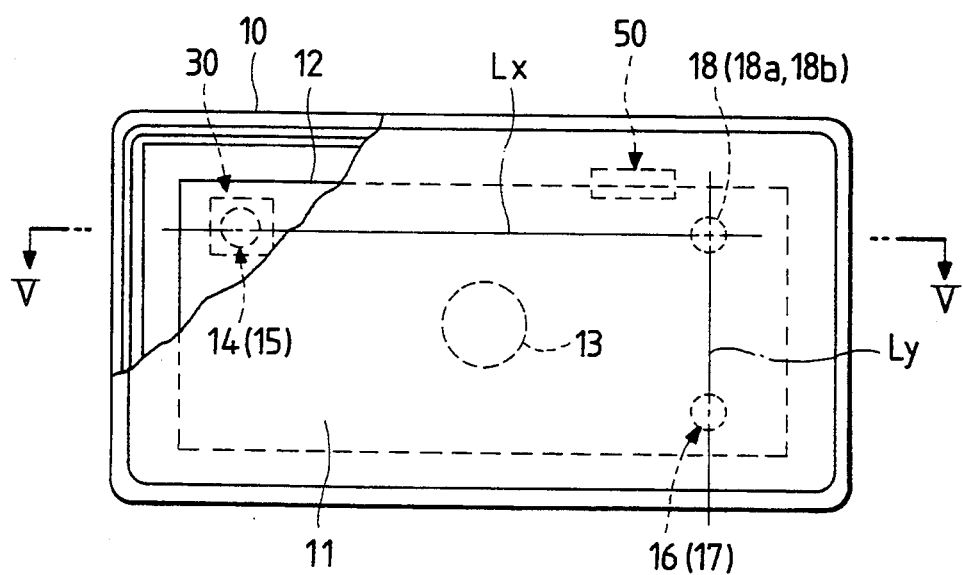
FIG. 4 is a front view showing a tiltable reflector headlamp according to a first embodiment of the present invention.
Figure 5:
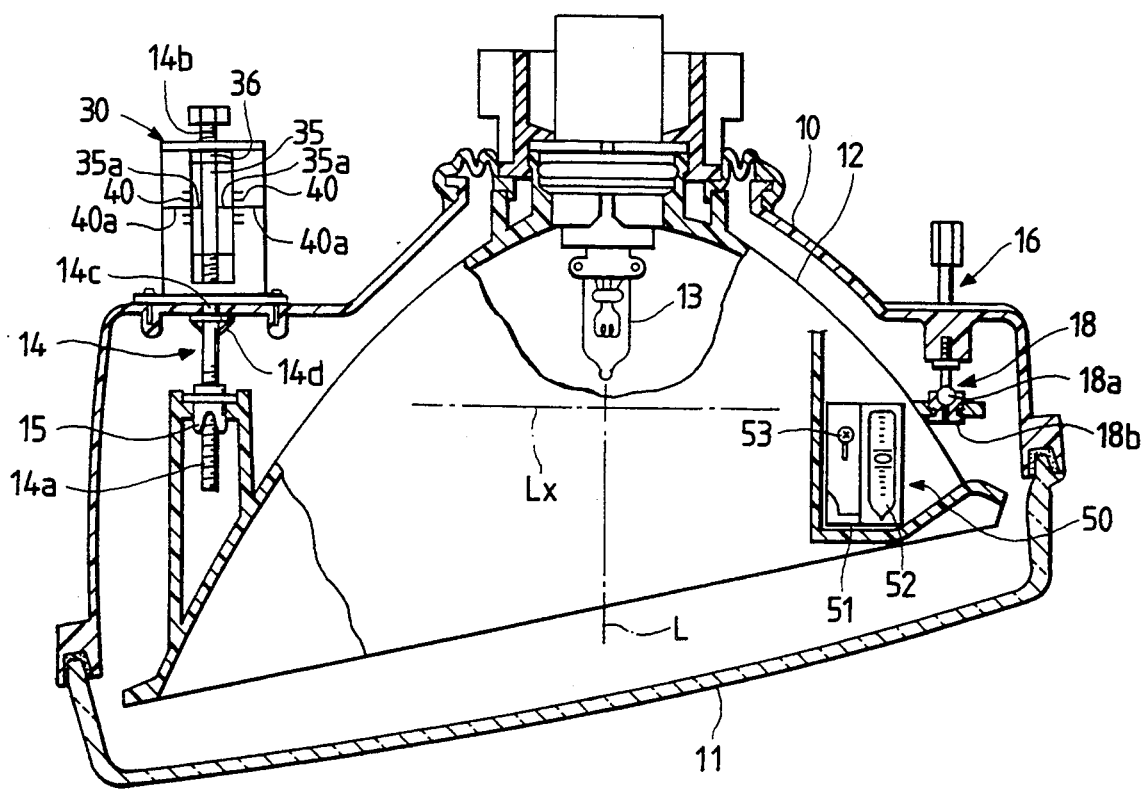
FIG. 5 is a sectional view taken on line V—V in FIG. 4.
Figure 6:
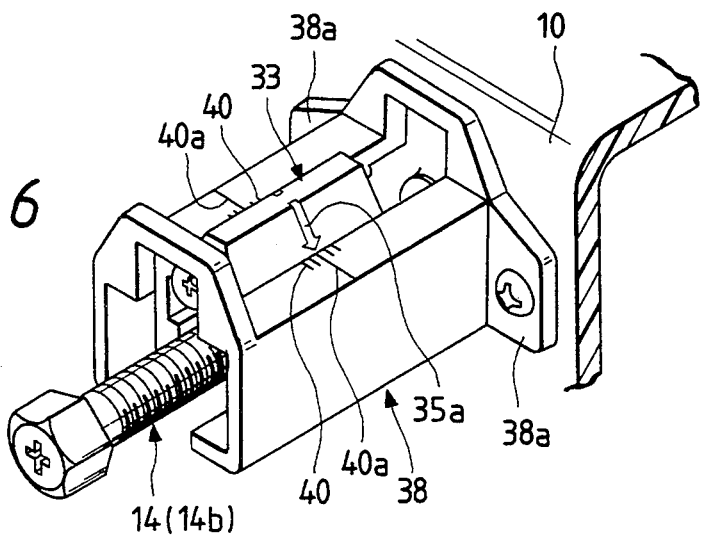
FIG. 6 is a perspective view showing a tilt measuring device for measuring a horizontal tilt of the light beam angle of the headlamp assembly.
Figure 7:
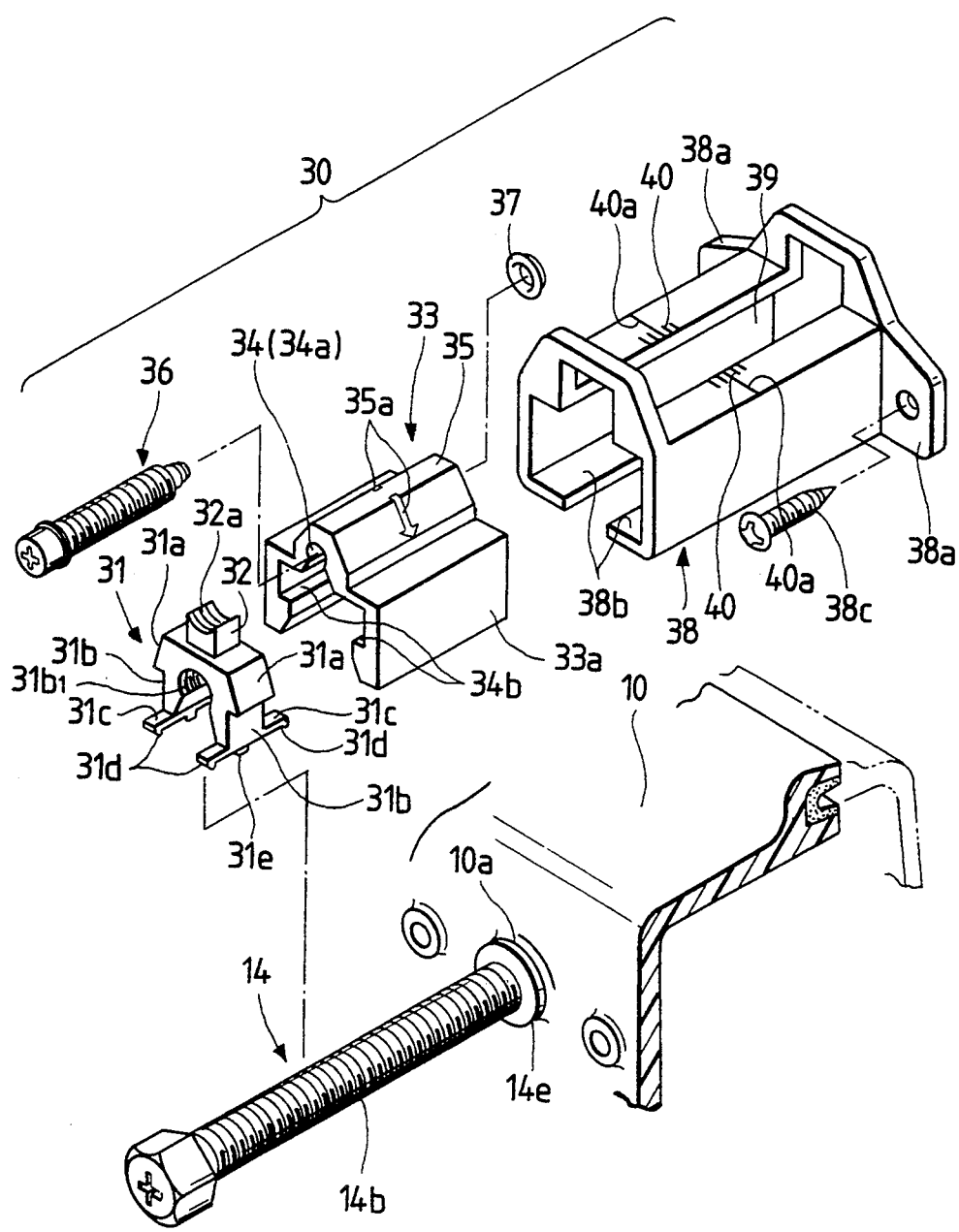
FIG. 7 is a fragmental view in perspective of the tilt measuring device of FIG. 6.
Figure 8:
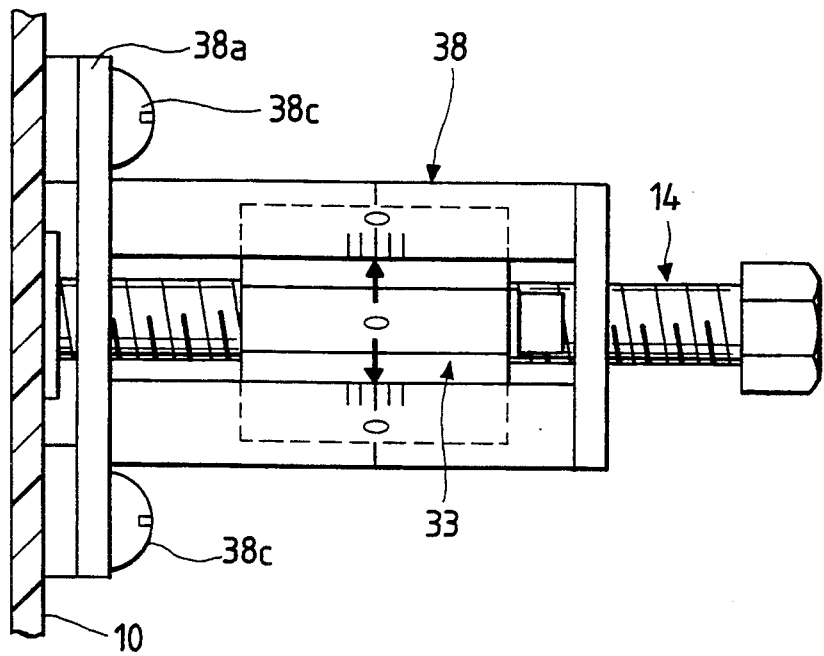
FIG. 8 is an enlarged plan view of the tilt measuring device of FIG. 6.
Figure 9:
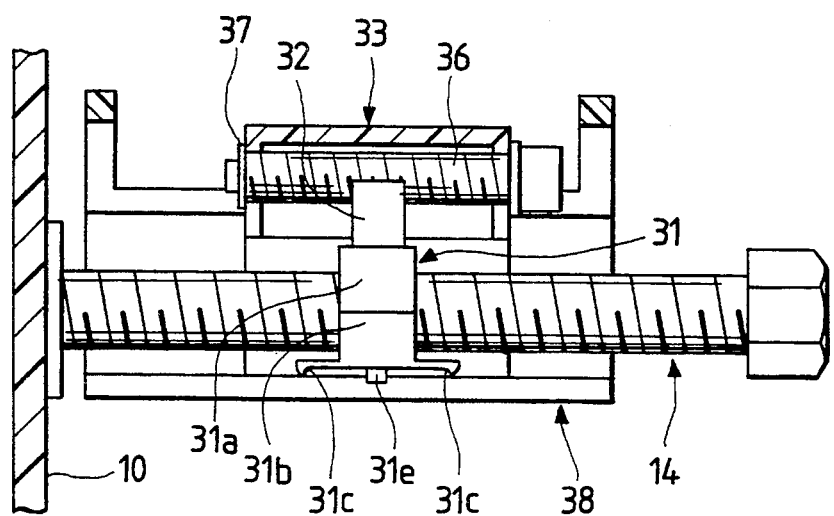
FIG. 9 is a longitudinal sectional view of the tilt measuring device of FIG. 6.
Figure 10:
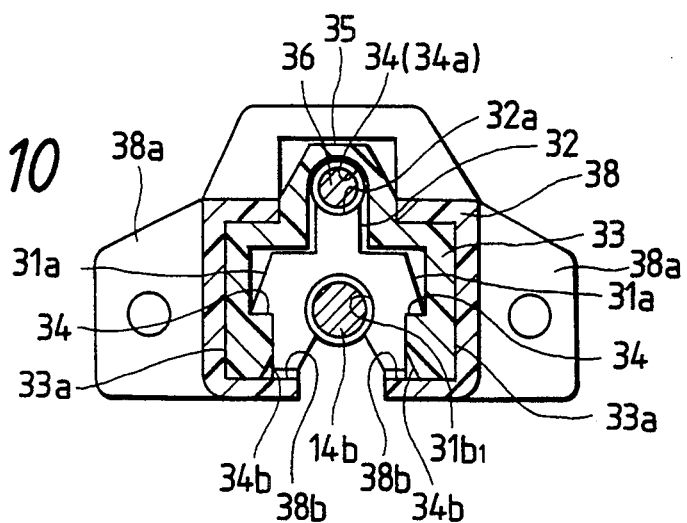
FIG. 10 is a cross-sectional view of the tilt measuring device as viewed from the rear side of the headlamp assembly.
Figure 11:
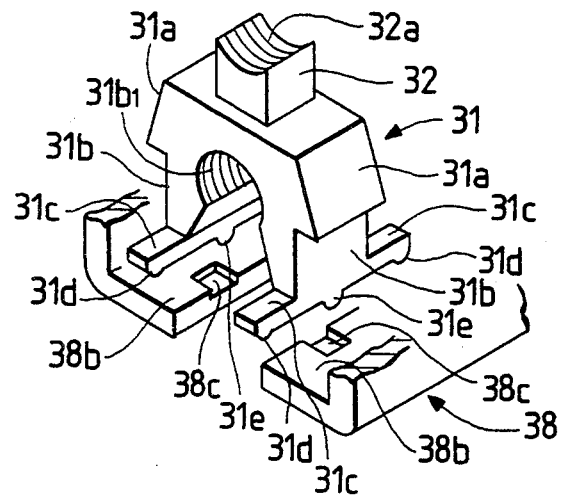
FIG. 11 is a perspective view showing the construction of a coupling part of a nut and a nut holder in the tilt measuring device of FIG. 6, the illustration showing the nut and the nut holder being separated.
Figure 12:
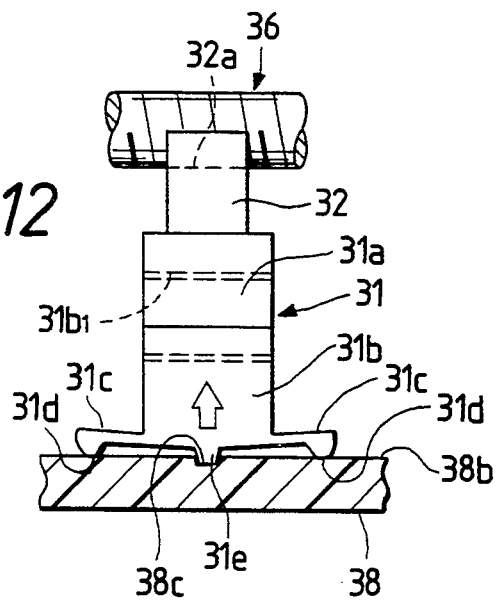
FIG. 12 is a perspective view showing the construction of a coupling part of a nut and a nut holder in the tilt measuring device of FIG. 6, the illustration showing the nut and the nut holder being coupled together.

Of these drawings, FIG. 4 is a front view showing a tiltable reflector headlamp having a tilt measuring device for measuring the amount of horizontal tilt of the light beam angle in the vehicular headlamp assembly, which is a first embodiment of the present invention. FIG. 5 is a sectional view taken on line V—V in FIG. 4. FIG. 6 is a perspective view showing a tilt measuring device for measuring the amount of horizontal tilt of the light beam angle of the headlamp assembly. FIG. 7 is a fragmental view in perspective of the tilt measuring device of FIG. 6. FIG. 8 is an enlarged plan view of the tilt measuring device of FIG. 6. FIG. 9 is a longitudinal sectional view of the tilt measuring device of FIG. 6. FIG. 10 is a cross-sectional view of the tilt measuring device as viewed from the rear side of the headlamp assembly. FIG. 11 is a perspective view showing the construction of a coupling part of a nut and a nut holder in the tilt measuring device of FIG. 6, the illustration showing the nut and the nut holder being separated. FIG. 12 is a perspective view showing the construction of a coupling part of a nut and a nut holder in the tilt measuring device of FIG. 6, the illustration showing the nut and the nut holder being coupled together.

Throughout those drawings, in a lamp body 10, a parabolically shaped reflector 12 is tiltably supported by means of two aiming screws 14 and 16 and a ball-and-socket joint 18. The aiming screw 14 functions to horizontally tilt the reflector about the vertical axis in FIG. 4. (The tilt of the reflector in this direction will be referred to as the horizontal tilt.) The aiming screw 15 functions to vertically tilt the reflector about the horizontal axis. (This tilt will be referred to as the vertical tilt.) The aiming screws 14 and 16, which extend forward and rearward passing through the lamp body 10, are rotatably supported at the screw-passing portions of the lamp body. The forward end parts of the screws are screwed into brackets 15 and 17 mounted on the rear side of the reflector 12, respectively. The ball-and-socket joint 18 has such a structure wherein a ball piece 18a of the joint, which projects forwardly from the rear side wall of the lamp body 10, is held within a socket 18b mounted on the rear side of the reflector 12. With rotation of the screws 14 and 16, the nuts 15 and 17 move forward and backward along the screws 14 and 16, respectively. As a consequence, the reflector 12 is tilted about the horizontal axis $L_x$ and the vertical axis $L_y$. In the Figure, reference numeral 11 designates a front lens, and numeral 13 indicates a bulb as a light source inserted into a bulb insertion hole of the reflector 12.

The horizonal aiming screw 14, which passes through the lamp body 10, is positioned and held by the lamp body 10 in a manner such that a snap ring 14d and a flange part 14e (see FIG. 7) cooperate to nip a thick part 10a of the lamp body. The snap ring 14d is mounted around a constricted part 14c of the screw shaft. The flange part 14e is also formed around the screw shaft. The part of the horizonal aiming screw 14, which protrudes from the lamp body toward the rear side of the lamp body, serves as a male screw part 14b of which the pitch is larger than that of a male screw part 14a at the forward end part of the screw.

A first tilt measuring device 30 for measuring the amount of horizontal tilt of the reflector 12, i.e., the amount of horizontal tilt of the light beam angle of the headlamp, is interposed between the protruding part of the horizonal aiming screw 14, which protrudes toward the rear side of the lamp body 10, and the lamp body 10.

A bubble-level type tilt measuring device 50, mounted on the upper part wall of the reflector 12, is provided for measuring the amount of vertical tilt of the reflector 12, i.e., the amount of vertical tilt of the light beam angle of the headlamp. In the bubble-level type tilt measuring device 50, a linear bubble vial 52 is housing in a casing 51. The zero point of the bubble position is adjusted by turning a vertical screw 53.

The detailed construction of the first tilt measuring device 30 will be described with reference to FIGS. 6 through 12.

A synthetic resin nut 31, U-shaped in cross section, receives the male screw part 14b of the horizontal aiming screw 14. The nut 31 is slidably held by a nut holder 33, which is also U-shaped in cross section and which is larger than the nut 31. A pair of guide parts 31a slant down outwardly from both sides of the nut. When the nut 31 is held by the nut holder 33, the guide parts 31a slidably rest on stepped parts 34b on the inner wall of a pair of legs 33a of the nut holder 33. A female screw part 31b1 receives the male screw part 14b of the horizonal aiming screw 14. A threaded part 32 protruding from the top of the nut 31 serves as a female part 32a. The inner wall of a screw receiving groove 34 formed in the nut holder 33 is threaded to form a female screw part 34a. The pitch of the female screw part 34a is equal to that of the female part 32a of the nut 31. A zero-adjustment screw 36, when inserted into the screw receiving groove 34, engages both the female screw parts 32a and 34a. Reference numeral 37 designates a stop ring for preventing the zero-adjustment screw 36 from being loosened.

The nut holder 33 is slidably held by a fixed holder 38, made of synthetic resin and U-shaped in cross section, for holding the horizonal aiming screw 14. The fixed holder 38 has a flange 38a at its forward end. The flange 38a of the fixed holder 38 is fastened to the lamp body 10 by means of screws. An elongated opening 39, formed in the top wall of the fixed holder 38, extends in the longitudinal direction of the holder. The nut holder 33 has a portion 35 protruding upward, the portion 35 being trapezoidal in cross section. When the nut holder 33 is coupled with the fixed holder 38, the upward protruding portion 35 protrudes upwards through the elongated opening 39. A pair of cursors 35a are inscribed near the middle of both the slanted sides of the nut holder 33. A pair of linear scales 40 are inscribed on the side edge portions of the elongated opening 39 located confronting respective ones of the cursors 35a. The zero point on the scale 40 is denoted as 40a.

An urging arm 31c is formed extending outward from both ends of the bottom of each of the paired legs 31b of the nut 31, which are located inside the paired legs 33a of the nut holder 33. Projections 31d respectively project downward from the both ends of each urging arm 31c. The projections 31d, as shown in FIG. 10, are in contact with flange-like nut slide surfaces 38b of the fixed holder, so that the nut 31 is urged upward, as indicated by an arrow in FIG. 12, thereby eliminating play among the nut 31, the nut holder 33, and the zero-adjustment screw 36.

A projections 31e projects downward from the bottom of each leg 31b. The projections 31e are fitted into small depressions 38c formed in the nut slide surfaces 38b, as best illustrated in FIGS. 11 and 12. When the nut 31, the nut holder 33 and the zero-adjustment screw 36 are assembled into the fixed holder 38, the assembly may be temporarily fastened to the holder with the aid of the combination of the projections 31e and the depressions 38c. Each depression 38c is provided at a location on the nut slide surfaces 38a (just under the zero point 40a on the scale) corresponding to the scale zero point 40a, so that the nut 31 can be positioned substantially in the middle of the nut holder 33 as viewed longitudinally when the former is assembled into the latter. With the arrangement that the nut 31 is positioned near the cursors 35a, when the nut holder 33 including the nut 31 and zero-adjustment screw 36 is assembled into the fixed holder 38, the projections 31e are fitted into the depressions 38c to temporarily fasten them in a state such that the cursors 35a are substantially coincident with the scale zero points 40a.

When the horizontal aiming screw 14 is turned, the nut 31 and the nut holder 33, both engaging the male screw part 14b of the screw 14, will slide forward or backward. However, the nut 33 cannot slide relative to the nut holder 33 since the nut 31 engages the zero-adjustment screw 36. Accordingly, the nut 31 and the nut holder 33 slide in unison within the fixed holder 38, and with this sliding movement, the cursors 35a move along the scales 40. Accordingly, the amount of tilt of the reflector 12 is transformed into a corresponding amount of movement of the cursor 35a relative to the scale zero point 40a. Therefore, the amount of tilt of the reflector 12 (a horizontal tilt of the light beams of the headlamp) can be determined from the graduation on the scale pointed to by the cursor 35a, assuming that the cursor 35a has been properly preset to the zero point 40a of the scale 40 (zero adjustment).

The projections 31e and the depressions 38c are provided only for positioning the nut 31 and fixed holder 38 when those members are coupled, and they do not hinder the sliding movement of the nut 31 (and the nut holder 33) along the nut slide surfaces 38b when the horizontal aiming screw 14 is turned.

The amount of movement of the nut 31, i.e., the amount of relative movement of the scale 40 and the cursor 35a, is $P_2/P_1$ times as large as the amount of tilt of the reflector 12, since the pitch $P_2$ of the male screw part 14b of the horizontal aiming screw is larger than the pitch $P_1$ of the male screw part 14a. Accordingly, an amplified tilt of the reflector 12 is indicated on the scale, thereby making it easy to read the scale and further providing a highly precise measurement.

The zero adjustment for the tilt measuring device is carried out by turning the zero-adjustment screw 36. More specifically, when the zero-adjustment screw 36 is turned, the nut 31 and the nut holder 33 together move forward or backward. However, the nut 31 cannot be moved because the it is tightly coupled with the male screw part 14b. Accordingly, the nut holder 33 slides relative to the nut 31, or slides within the fixed holder 38, and the cursors 35a move along the scale 40.

An example of a procedure for assembling the tilt measuring device 30 into the vehicular headlamp assembly that is mounted on an automobile body and properly aimed will now be discussed.

First, the zero-adjustment screw 36 is forcibly inserted into the screw receiving groove 34 from the nut slide path of the nut holder 33. The nut 31 is forcibly inserted into the nut holder 33 from the lower opening of the nut holder. The paired legs 33a of the nut holder are pressed against the slanted surfaces of the guide parts 31a of the nut 31. The guide parts engage the stepped parts 34b of the holder. The female part 32a of the nut 31 receives the zero-adjustment screw 36. As a result, the nut is assembled into the nut holder, thereby forming a single unit. The zero-adjustment screw 36 is turned to set the nut 31 substantially at the middle of the nut holder 33 (in the longitudinal direction). That is, the nut 31 is positioned directly under the cursors 35a. The assembly of the nut, nut holder, and zero-adjustment screw is inserted into the fixed holder 38. The projections 31e projecting from both ends of the bottoms of the legs 31b of the nut are fitted into the depressions 38c formed in the nut slide surfaces 38b of the nut holder for purposes of positioning. The nut-nut holder assembly is temporarily fastened to the fixed holder in such a state that the cursors 35a are substantially coincident with their respective scale zero points 40a. The fixed holder assembly containing the nut-nut holder assembly is applied, with its lower opening, to the rearward projecting part 14b of the horizontal aiming screw 14. Then, the legs 31b of the nut 31 are forcibly applied to the male screw part 14b. The fixed holder 38 is fixed to the lamp body 10 by means of fixing screws 38d. At this point, the assembly work of the tilt measuring device 30 into the lamp body is completed.

If the aiming screws 14 and 16 are turned and the optical axis is unintentionally shifted during the assembling work of the tilt measuring device 30, an aiming adjustment is carried out by turning the horizontal aiming screws 14 and 16, and the cursors 35a are set to the zero points 40a by turning the zero-adjustment screw 36.

Figure 13:
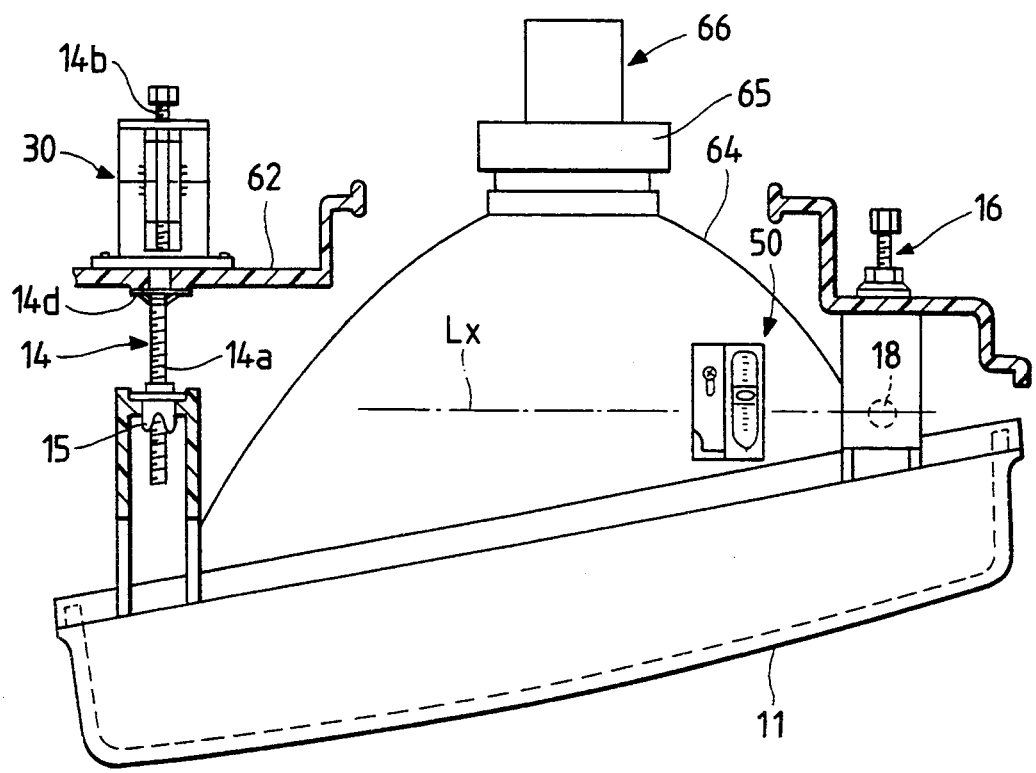
FIG. 13 is a plan view, partly in cross section, of a vehicular headlamp assembly of the tiltable unit according to a second embodiment of the present invention.

FIG. 13 is a partial sectional view showing a tiltable unit headlamp assembly incorporating the invention, which is a second embodiment of the present invention. As already discussed, the tiltable unit headlamp assembly is constructed such that the reference member is the lamp housing, and the tilting member is a lamp-body/reflector unit. Also as already mentioned, the lamp-body/reflector unit includes a reflector integral with the spherical inner surface of the lamp body.

As shown in FIG. 13, a first tilt measuring device 30 for measuring a tilt of the light beam angle of the headlamp in the horizontal direction is interposed between the lamp housing 62 and the male screw part 14b of the horizontal aiming screw 14, which protrudes rearwardly from the lamp housing 62. A second tilt measuring device 50 for measuring the light beam angle in the vertical direction is mounted on the upper wall of the lamp body unit 64. The constructions of the first and second tilt measuring devices 30 and 50 are substantially the same as those of the tiltable reflector headlamp assembly already described in detail. Therefore, like reference symbols are applied to the like or equivalent portions, and no further detailed description of these elements will be given. In FIG. 13, reference numeral 66 designates a bulb, and reference numeral 65 a locking cap for locking the bulb 66 in the bulb hole of the lamp body unit 64.

Figure 14:
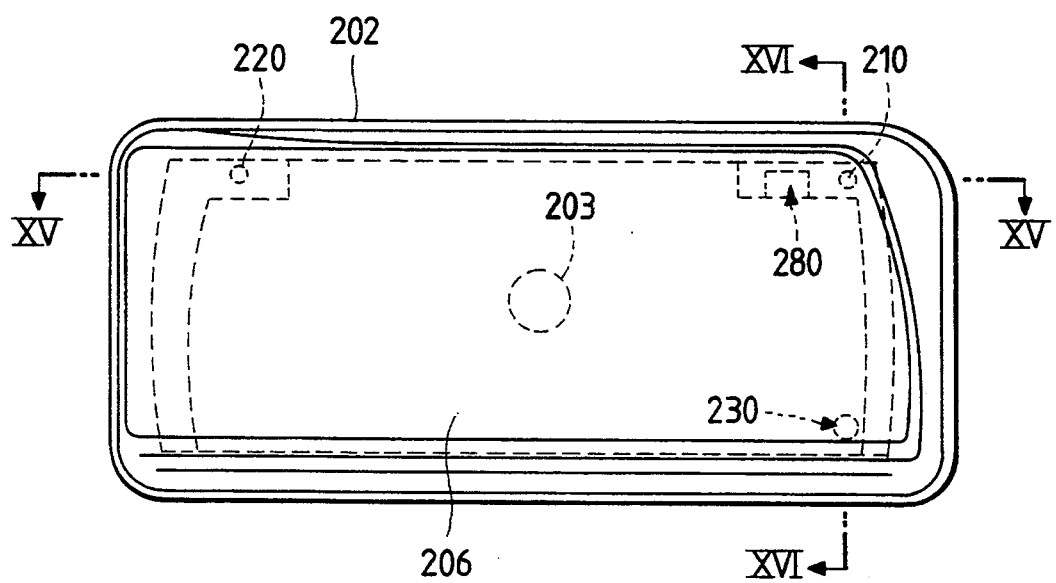
FIG. 14 is a front view of the tiltable reflector vehicular headlamp assembly provided with a tilt measuring device according to a third embodiment of the present invention.
Figure 15:
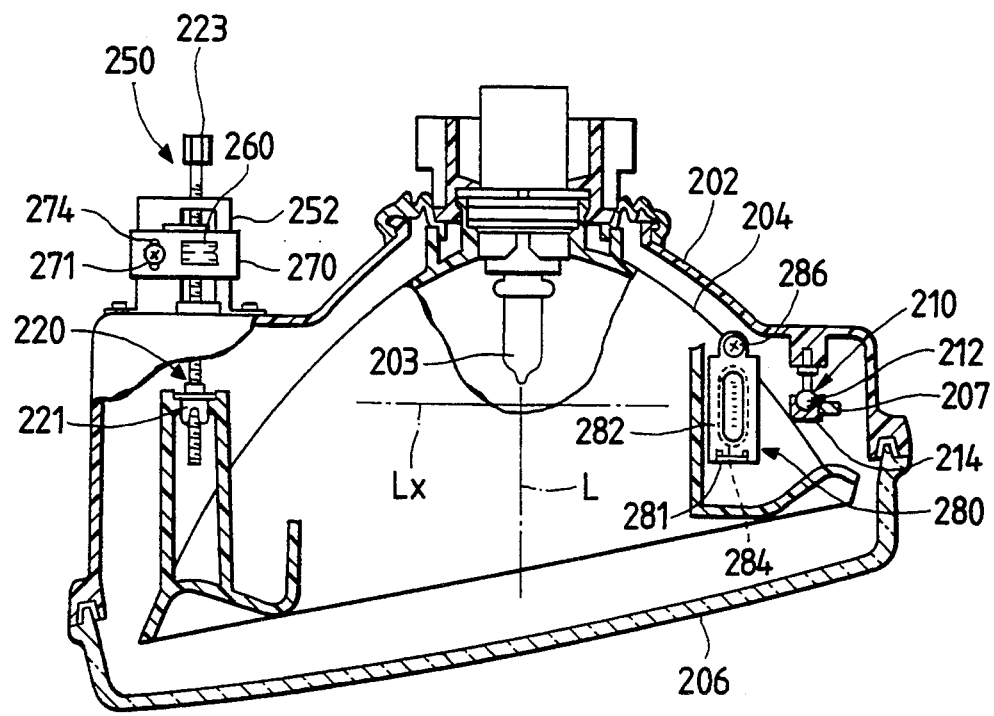
FIG. 15 is a cross-sectional view taken on line XV—XV in FIG. 14.
Figure 16:
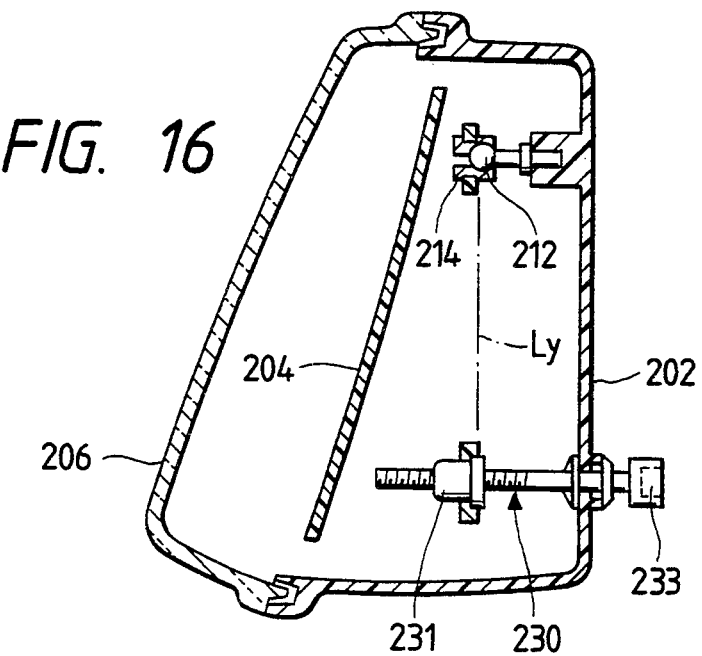
FIG. 16 is a cross-sectional view taken on line XVI—XVI in FIG. 14.
Figure 17:
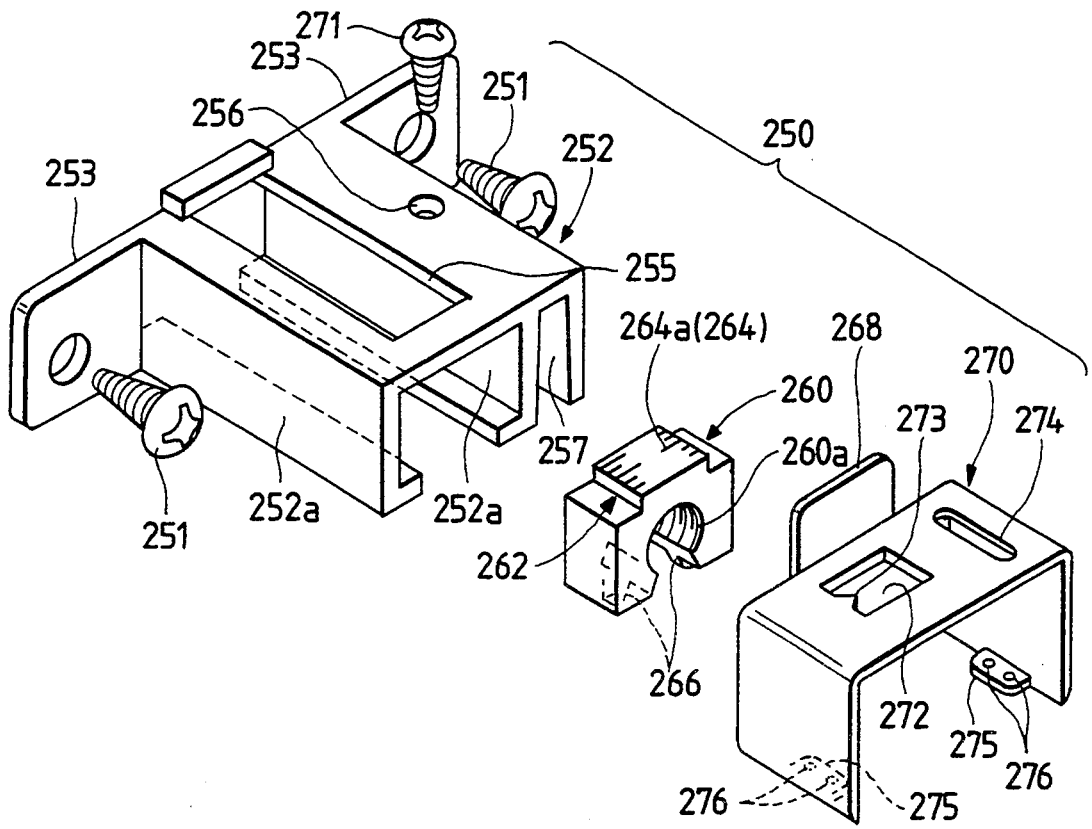
FIG. 17 is an exploded view in perspective of a tilt measuring device for measuring a tilt of a lateral light beam angle of the headlamp.
Figure 18:
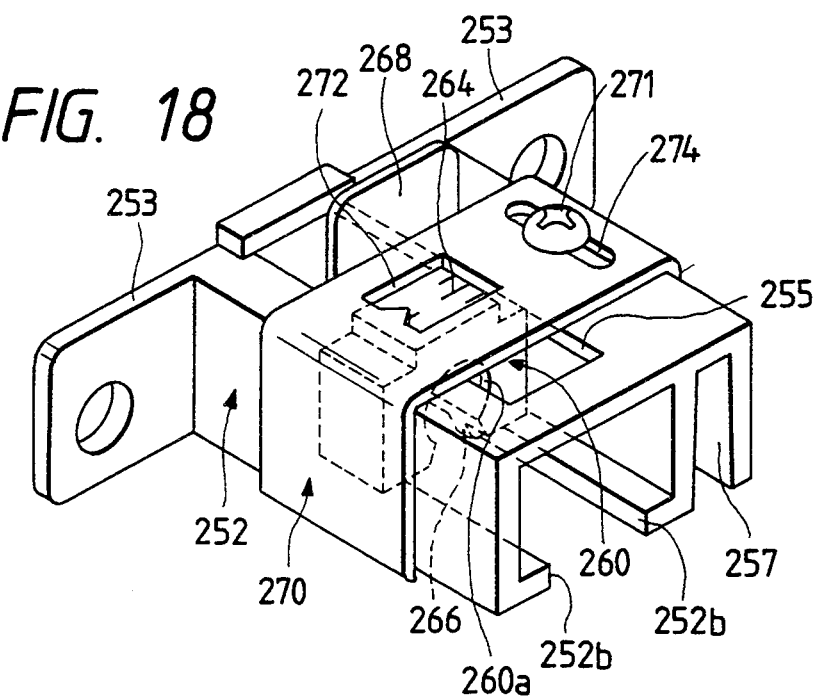
FIG. 18 is a perspective view showing the tilt measuring device.
Figure 19:
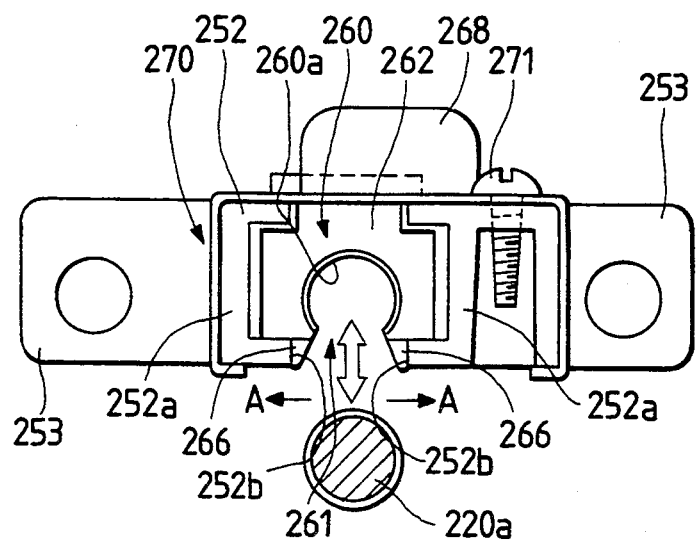
FIG. 19 is a rear elevation of the tilt measuring device when seen from the rear of the device.
Figure 20:
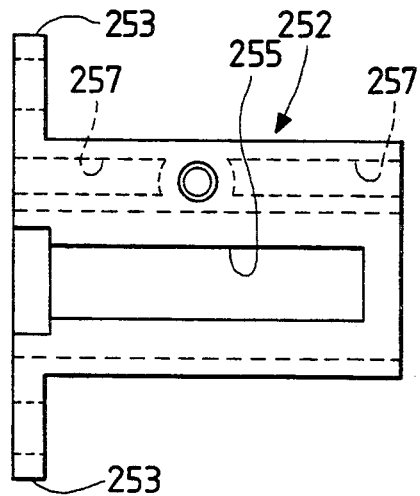
FIG. 20 is a plan view showing a fixed holder as a part of the tilt measuring device.

A third embodiment of the present invention will be described with reference to the accompanying drawings. FIGS. 14 through 20 taken together diagramtically depict the third embodiment of the present invention, in which the invention is applied to a vehicular headlamp assembly of the tiltable unit type. In this type of the vehicular headlamp assembly, the reference member is the lamp body and the tilting member is the reflector. FIG. 14 is a front view of the tiltable reflector vehicular headlamp assembly provided with a tilt measuring device. FIG. 15 is a sectional view of the vehicular headlamp assembly when it is laterally cut (cross-sectional view taken on line XV—XV in FIG. 14). FIG. 16 is a sectional view of the vehicular headlamp assembly when it is longitudinally cut (cross-sectional view taken on line XVI—XVI in FIG. 14). FIG. 17 is an exploded view in perspective of a tilt measuring device for measuring a tilt of a lateral light beam angle of the headlamp. FIG. 18 is a perspective view showing the tilt measuring device. FIG. 19 is an elevation of the tilt measuring device (rear elevation of the tilt measuring device when seen from the back of the device). FIG. 20 is a plan view showing a fixed holder as a part of the tilt measuring device.

In these Figures, a reflector 204 having a parabolic surface as the tilting member is disposed in a lamp body 202. A bulb 203 is mounted to the reflector 204. A front lens 206 is mounted over the front opening of the lamp body 202.

As shown in FIGS. 14 through 16, within the lamp body 202, the reflector 204 is supported at three points by a ball-and-socket joint 210, a horizontal aiming screw 220, and a vertical aiming screw 230. A ball section 212 of the ball-and-socket joint 210 is fixedly supported on the lamp body 202. A socket section 214 for receiving the ball section 212 is fixedly mounted on a bracket 207 protruding from the rear side of the reflector 204. The reflector 204 is tilted about the ball-and-socket joint 210. The aiming screws 220 and 230, which extend in the front-to-rear direction of the lamp body 202 passing therethrough, are supported at the screw-passing portions of the lamp body. The forward end portions of the screws 220 and 230 are threaded into screw support nuts 221 and 231 of the reflector 204. Tool engaging parts 223 and 233 for receiving a tool, for example, a screw driver, are formed in the ends of the extended parts of the aiming screws 220 and 230. When the aiming screws 220 and 230 are turned, the nuts 221 and 231 are advanced or retracted along the aiming screws 220 and 230 so that the reflector 204 is tilted.

The support point where the aiming screw 220 engages the nut 221 of the reflector 204 by the aiming screw 220 lies on the horizontal axis $L_x$, which is orthogonal to the light beam (optical) axis L (see FIG. 15) of the headlamp and passes through the ball-and-socket joint 210. The support point (where the aiming screw 230 engages the screw support nut 231) of the unit 204 by the aiming screw 230 lies on the vertical axis $L_y$, which is orthogonal to the light beam axis L and the vertical line $L_y$ passing through the ball-and-socket joint 210). With such a structure, when the aiming screw 220 is turned, the nut 221 is advanced or retracted along the screw 220, so that the reflector 204 is tilted about the vertical axis $L_y$. Accordingly, the reflector 204 (the tilting member) is horizontally tilted with respect to the lamp body 202 (the reference member). In other words, the horizontal light beam angle of the headlamp is adjusted. When the aiming screw 230 is turned, the nut 231 advanced or retracted along the screw 230 so that the reflector 204 is tilted about the horizontal axis $L_x$. Accordingly, the reflector 204 (the tilting member) is vertically tilted with respect to the lamp body 202 (the reference member). In other words, the vertical light beam angle of the headlamp is adjusted. In this way, the reflector 204 can be tilted or the light beam angle of the headlamp can be adjusted by turning the two aiming screws 220 and 230.

A first tilt measuring device 250 for measuring the amount of horizontal tilt of the lamp body 202, i.e., the amount of horizontal tilt of the light beam angle of the headlamp, is provided between the male screw part 220a formed around the rear part of the aiming screw 220 protruding from the lamp body 202 and the lamp body. The detailed construction of the first tilt measuring device 250 will be discussed with reference to FIGS. 17 to 20.

The first tilt measuring device 250 includes a fixing holder 252 U-shaped in cross section, which is fastened to the lamp body 202 and covers the male screw part 220a of the aiming screw, a nut 260 longitudinally slidably mounted in the fixing holder 252, and a cover 270 mounted around the fixing holder 252.

An elongated opening 261 (see FIG. 19) is formed in the underside of the nut 260. Accordingly, the nut 260, which is made of synthetic resin, is made U-shaped in cross section. The male screw part is inserted into the nut 260 through the elongated opening 261. The inner surface of the nut 260 is threaded to form a female part 260a, which receives the male screw part 220a of the aiming screw. The nut 260 can be easily coupled into the male screw part 220a by setting the elongated opening 261 of the nut on the side of the male screw part 220a and pressing the nut 260 (as indicated by the arrow in FIG. 19).

A flange 253, which extends outward to the right and left, is formed at the forward end of the fixing holder 252. The flange 253 is fixed to the lamp body 202 by means of screws 251. The nut 260 coupled with the male screw part 220a is slidably held within the U-shaped fixing holder 252. When the aiming screw 220 is turned, the nut 260 moves forward or rearward along the male screw part 220a within the fixing holder 252. A pair of engaging projections 266 projecting downward are oppositely disposed with respect to the elongated opening 261. The engaging projections 266 engage the lower edge portions 252b of the fixing holder 252 so that the nut 260 is positioned within the fixing holder 252. The size of the nut 260 is selected so as to leave a gap between the nut 260 and the inner wall of the holder, thereby resulting in a low sliding friction between the nut 260 and the fixing holder 252.

Engagement of the engaging projections 266 with the lower edge portions 252b ensures smooth sliding of the engaging projections 266 with no play of the nut 260. A longitudinally extending opening 255 is formed in the top surface of the fixing holder 252. An upward protruding portion 262 (see FIGS. 17 and 19) is inserted into the opening 255. The top surface of the upward protruding portion 262 is marked with a linear scale 264. The linear scale 264 is exposed through the opening 255. Reference numeral 256 designates a hole into which a screw 271 is threaded for fastening the cover 270. The fixing holder 252 is formed with a groove 257 which extends longitudinally and opens downward, except for the area of the hole 256. Due to the presence of the groove 257, a holder 252a holding the nut 260 is rendered flexible. When the elongated opening 261 of the nut 260 assembled into the fixing holder 252 is pressed against the male screw part 220a, the opening 261 of the nut 260 and the opening of the fixing holder 252 are expanded outwardly (in the direction of an arrow A in FIG. 19). Accordingly, the male screw part 220a can smoothly be screwed into the female part 260a.

The cover 270 fastened to the fixing holder 252 by means of the screw 271 is also U-shaped in cross section. A window 272 is formed in the upper wall of the cover 270 at a location corresponding to the opening 255. The linear scale 264 can be viewed from the window 272 through the opening 255. A cursor 273 serving as a reference point on the linear scale 264 protrudes from the inner edge of the window 272. The cursor 273 and the linear scale 264 cooperate to indicate the amount of movement of the nut 260 relative to the hole 256. An elongated hole 274 is formed in the cover 270 adjacent to the window 272. The peripheral edge of the elongated hole 274 is fixed to the holder extended part by means of the screw 271. Paired slide projections 276 are formed on each of pawls 275 of the cover 270, ensuring a smooth sliding movement of the cover 270. When the screw 271 is loosened, the cover 270 is allowed to slide along the fixing holder 252, that is, the cursor 273 may be moved along the linear scale 264. Reference numeral 276 designates an upright knob formed at the forward edge of the cover 270. The cover 270 is moved forward and rearward with the knob 270.

When the aiming screw 220 is turned, the nut 260 is advanced or retracted along the fixing holder 252. Accordingly, the amount of horizontal movement of the reflector 204 (i.e., the amount of inclination of the reflector about the vertical axis $L_y$) is transformed into movement of the nut 260 (linear scale 264). Accordingly, the amount of horizontal tilt of the reflector 204 can be from the linear scale 264, assuming that the cursor 273 has been previously set to the zero-point 264a on the linear scale 264 (the setting operation of the cursor to the zero-point will be referred to a zero-point adjustment). The zero-point adjustment is carried out by loosening the screw 271 and sliding the cover 270 along the fixing holder 252.

An example of the procedure for coupling the first tilt measuring device 250 to the aiming screw 220 will be described with reference to FIG. 18.

Before the first tilt measuring device 250 is coupled to the aiming screw, the aiming adjustment (adjustment of the reflector 204 in the horizontal and vertical directions) of the headlamp has been completed. The first tilt measuring device 250 is coupled with the aiming screw 220 of the aiming-adjusted headlamp. First, the nut 260 is slid into the fixing holder 252 from the forward or rear end, and the cover 270 is temporarily fastened by means of the screw 271, so that the nut 260, the fixing holder 252, and the cover 270 are assembled into a one-piece assembly. Then, as shogun in FIG. 19, the one-piece assembly is pressed against a predetermined location of the male screw part 220a of the aiming screw, thereby to fit the male screw part 220a into the female part 260a of the nut 260. The fixing holder 252 is slid relative to the nut 260 until the flange 253 is brought into contact with the rear side of the lamp body 202, and the fixing holder 252 is fastened to the lamp body 202 by means of the screws 251. Then, the cover 270 is slid for the zero-adjustment, and the cover 270 is fixed to the fixing holder 252 by means of the screw 271. In this way, the first tilt measuring device 250 can easily be mounted to the aiming screw 220.

In FIGS. 14 and 15, reference numeral 80 designates a bubble-type tilt measuring device for measuring the amount of vertical tilt of the reflector 204, i.e., the amount of vertical tilt of the light beam angle of the headlamp. The bubble-type tilt measuring device 280 is formed with a casing 281 opened upwardly, a cover 282 tiltably supported on the casing 281, and a linear bubble vial 284 mounted in the casing 281 suspended from the cover 282. Reference numeral 286 indicates a screw for adjusting the tilt angle of the cover 282, i.e., adjusting the zero point of the bubble tube.

The third embodiment of the present invention has been described using a tiltable reflector headlamp as an example. It is evident, however, that this embodiment of the present invention is also applicable to a headlamp of the movable unit type in which the reference member is the lamp housing and the tiltable member is the lamp body/reflector unit, more particularly, to a lamp-body/reflector unit as a tilting member in which the reflector is integrally formed on the inner spherical surface of the lamp body, and the latter is tiltably supported on a lamp housing as a reference member by means of an aiming mechanism.

The fourth embodiment of the present invention will be described with reference to the accompanying drawings.

Figure 21:
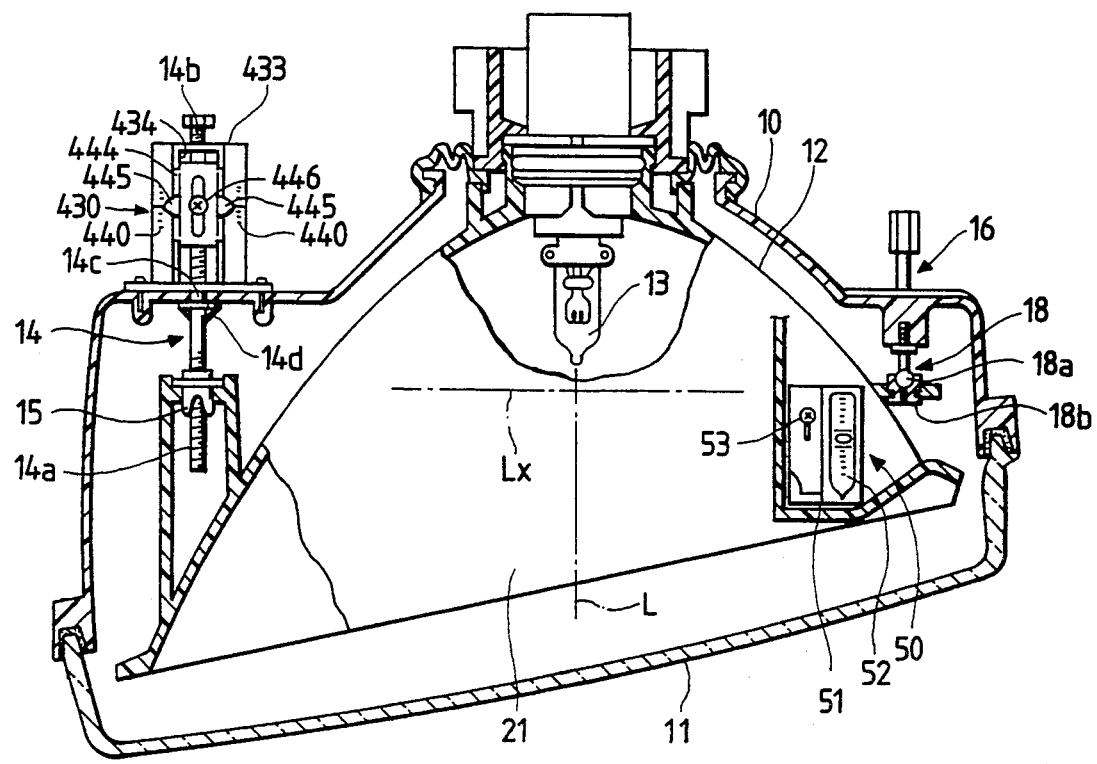
FIG. 21 is a sectional view of the headlamp assembly when it is horizontally cut.
Figure 22:
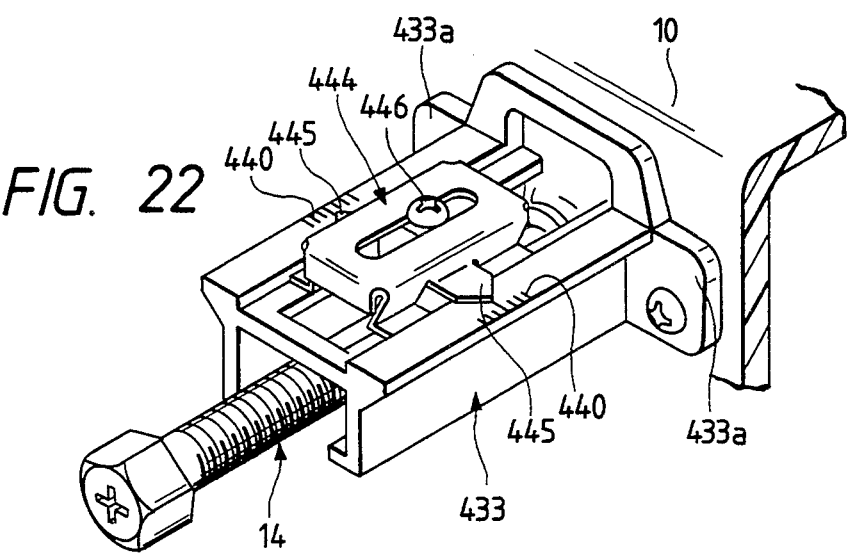
FIG. 22 is a perspective view showing a tilt measuring device for measuring a horizontal tilt of the light beam angle of the headlamp.
Figure 23:
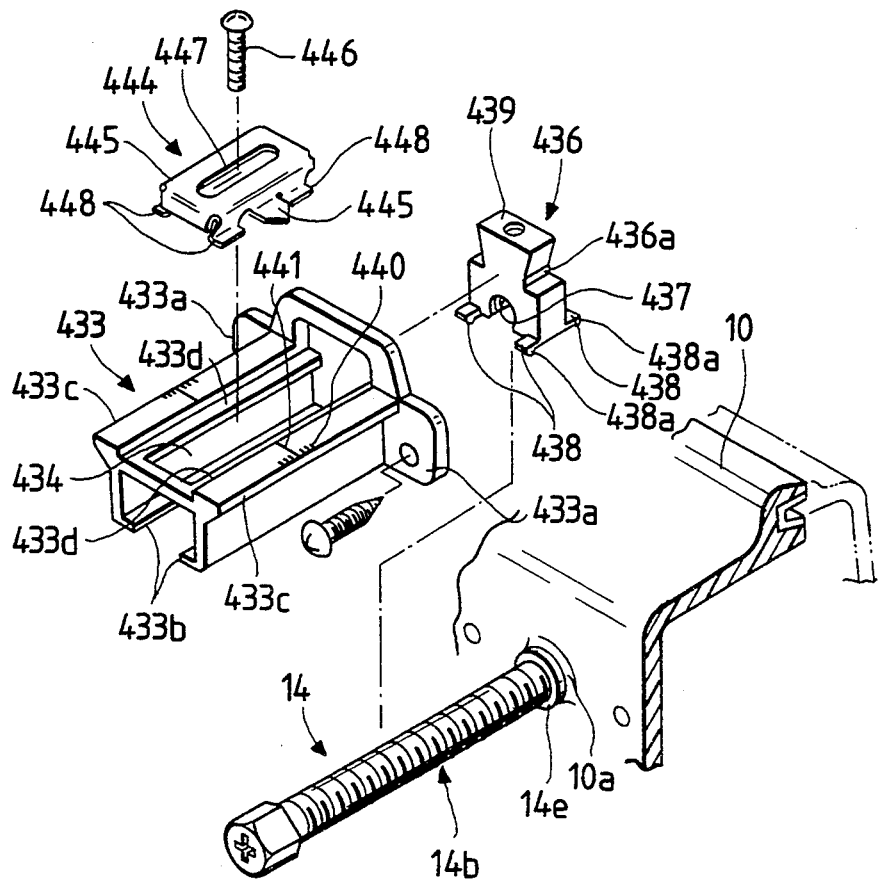
FIG. 23 is an exploded view showing the tilt measuring device.
Figure 24:
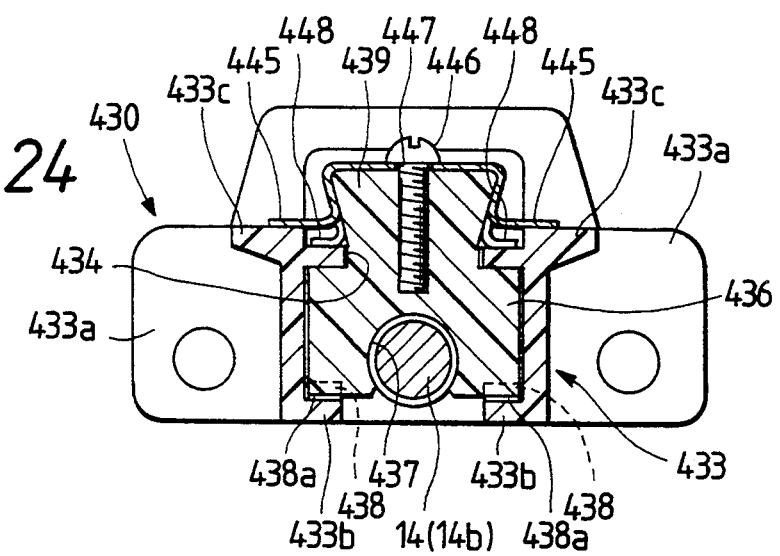
FIG. 24 is a cross-sectional view (seen from the rear side of the headlamp assembly) of the tilt measuring device.

FIGS. 21 through 24 show the fourth embodiment of the present invention in which the invention is applied to a tiltable reflector headlamp assembly. FIG. 21 is a sectional view of the headlamp assembly horizontally cut. FIG. 22 is a perspective view showing a tilt measuring device for measuring the amount of horizontal tilt of the light beam angle of the headlamp. FIG. 23 is an exploded view showing the tilt measuring device. FIG. 24 is a cross-sectional view (seen from the rear side of the headlamp assembly) of the tilt measuring device.

Since the fourth embodiment is a modification of the first embodiment, like reference numerals are used in the drawings for like or equivalent portions in the first embodiment.

A first tilt measuring device 430 for measuring the amount of horizontal tilt of the reflector 12, i.e., the amount of horizonal tilt of the light beam angle of the headlamp, is interposed between the protruding part of the horizontal aiming screw 14, which protrudes toward the rear side of the lamp body 10, and the lamp body 10.

The tilt measuring device 430 will be described with reference to FIGS. 22 through 24.

A synthetic resin nut 436 U-shaped in cross section is threaded into the male screw part 14b of the horizontal aiming screw 14. The nut 436 is slidably mounted in a generally U-shaped nut holder 433 made of synthetic resin. The nut holder 433, covering the horizontal aiming screw 14, has flange portions 433a at its forward end. The nut holder is fixed at the flange portions to the lamp body 10 by means of screws. A longitudinally extended hole 434 is formed in the top wall of the nut holder 433. A narrowed part 436a located near the middle of the nut 436 engages the circumferential edge of an opening 434 of the nut holder 433. A pair of flanges 433b are extend inwardly from the bottom ends of the side walls of the nut holder 433. A pair of arms 438 each having arcuate slide projections 438a extend outwardly from the bottom end of each leg of the screw engaging part 437. A screw engaging part 437 is formed in the lower part of the nut 436. The arms 438 slidably engage the flanges 433b. The arcuate slide projections 438a are provided for providing a smooth sliding movement of the arms 438 relative to the flanges 433b.

A pair of 433c outwardly extending flange portions 433c are formed on the top wall of the nut holder 433, and linear scales 440 are inscribed thereon. Reference numeral 441a indicate zero points on the scales. A rectangular cap-like slide cursor 444, which is formed by cutting and bending a thin metal plate, is fixed to the upwardly protruding part 439 of the nut 436 by means of screw. The protruding part 439 protrudes upwardly through an opening 434 of the nut holder 433. Reference numeral 445 indicate cursor pointers. The reading on the scale pointed to by the cursor pointer 445 indicates the amount of horizontal movement, i.e., the amount of horizontal tilt of the light beam angle of the headlamp. A cursor fixing screw 446 passes through an elongated hole 447 in the slide cursor 444, and is screwed into the top surface of the nut. Accordingly, the slide cursor 444 is slidable along the side wall of the nut 436. Outwardly extending slide guides 448 are provided on the bottom side edge of the slide cursor 444. The slide guides 448 slide on the flat, opening edge portions 433d stepped down from the flange portions 433c of the nut holder 433. Each cursor pointer 445 of the slide cursor 444 slides on the scale forming surface of the nut holder 433.

When the horizontal aiming screw 14 is turned, the nut 436 engaging the male screw part 14b of the screw slides relative to the nut holder 433, that is, the cursor pointers 445 slide along the respective linear scales 440. The amount of tilt of the reflector 12 is expressed in the form of an amount of movement of the cursor pointer 445 on the slide cursor 440. If the slide cursor 444 is set at the zero point 441 on the linear scale 440 (this cursor setting is called zero-adjustment), the amount of tilt of the reflector 12 (the amount of horizontal tilt of the light beam direction of the headlamp) can be determined from the graduation on the linear scale 440 indicated by the cursor pointer 445. The amount of movement of the nut 36, i.e., the amount of relative movement of the scale 440 and the cursor pointer, is $P_2/P_1$ times as large as the amount of tilt of the reflector 12, since the pitch $P_2$ of the male screw part 14b of the horizontal aiming screw is larger than the pitch $P_1$ of the male screw part 14a. Accordingly, an amplified tilt of the reflector 12 is indicated on the scale, making it easy to read the scale and further providing a highly precise measurement.

An example of the procedure for mounting the first tilt measuring device 430 to the headlamp will be described.

The nut 436 is first slid into the nut holder 433. The slide cursor 444 is applied, utilizing its resiliency, to the protruding part 439 of the nut 436, which is to be protruded upward from the holder. The cursor pointers 445 are set to the zero points 440 on the respective linear scales 440. The slide cursor 444 is fixed to the nut 436 by means of screws. In this way, the tilt measuring device is assembled. Then, the mounting work of the tilt measuring device thus assembled into the headlamp mounted on a vehicle is performed. The mounting work is readily carried out by merely pressing nut 436 onto the lamp body rearward protruding portion of the horizontal aiming screw 14. When the tilt measuring device unit is mounted to the headlamp, if the horizontal aiming screw 14 is unintentionally turned and the zero point is shifted, the zero adjustment can be carried out by loosening the screw 46 and moving the slide cursor 444.

As seen from the foregoing description, in the vehicular headlamp assembly of the invention, the amount of horizontal tilt of the light beam angle of the headlamp, i.e., the amount of tilt of a tilting member (the reflector in the tiltable reflector headlamp and the lamp-body/reflector unit in the tiltable unit headlamp) with respect to the reference member (the lamp body in the tiltable reflector headlamp and the lamp housing in the tiltable unit headlamp) is indicated by a graduation on the scale of the tilt measuring device interposed between the horizontal aiming screw and the reference member. This indicated graduation indicates the amount of horizontal tilt of the tilting member, i.e., the amount of horizontal inclination of the light beam angle of the headlamp.

Further, to adjust a deviated horizontal light beam angle of the headlamp, the tilting member is tilted by turning the aiming screw so that a graduation of the tilt measuring device is set to a predetermined position. Further, the zero adjustment for the scale is carried out by turning the zero-adjustment screw. Thus, the horizontal light beam angle of the headlamp can easily be adjusted.

As described above, the tilt measuring device is interposed between the protruding portion of the aiming screw, which protrudes rearward, and the reference member. Therefore, there is no need of forming an opening in the reference member through which a slider passes.

With the inventive arrangement of the tilt measuring device on the rear side of the reference member, the scale of the measuring device can easily be accessed. Further, this feature realizes a headlamp of low height which occupies a decreased space in the automobile body.

Moreover, the inventive tilt measuring device has no portion which can easily be damaged or broken by tools such as a screwdriver or wrench. Accordingly, the work required to inspect the headlamp and to adjust the aiming direction thereof can smoothly be carried out. Only three components, namely the fixed holder, the nut means, and the cover, are required to form the tilt measuring device of the invention. Therefore, the inventive tilt measuring device requires a lesser number of parts, and is simple in construction and low in cost.

Additionally, the female screw part can be coupled with the male screw part of the aiming screw in a simple manner by merely pressing the male screw introducing opening of the nut against the male screw part of the aiming screw. Thus, the work to mount the tilt measuring device to the headlamp is very simple.

What is claimed is:

1. A vehicular headlamp assembly of a tilting member type in which a tilting member including a reflecting surface is supported on a reference member by a pivot, a horizontal aiming screw, and a vertical aiming screw, a light beam angle of said headlamp being adjusted by turning said horizontal and vertical aiming screws so that said tilting member is horizontally and vertically tilted with respect to said reference member, said vehicular headlamp assembly comprising a tilt measuring device for measuring an amount of tilt of said tilting member in said horizontal direction, said tilt measuring device protruding rearward of the reference member and the reference member, and said tilt measuring device comprising:

a fixed holder fixed to said reference member and covering at least a portion of a protruding portion of said horizontal aiming screw protruding rearward of said reference member, an elongated groove being formed in said fixed holder extending parallel to said horizontal aiming screw;

nut means received in said fixed holder and longitudinally slidable relative to said fixed holder, said nut means threadedly engaging said protruding portion of said horizontal aiming screw, a portion of said nut means being exposed through said elongated groove of said fixed holder; and a scale cooperating with said portion of said nut means exposed through said elongated groove for indicating an amount of displacement of said nut means relative to said fixed holder.

2. The vehicular headlamp assembly according to claim 1, wherein said reference member is a lamp body, and said tilting member is a reflector tiltably mounted within said lamp body.

3. The vehicular headlamp assembly according to claim 1, wherein said reference member is a lamp housing, and said tilting member is a lamp body/reflector unit formed integrally with an inner spherical surface of said lamp body.

4. A vehicular headlamp assembly of a tilting member type in which a tilting member including a reflecting surface is supported on a reference member by a pivot, a horizontal aiming screw, and a vertical aiming screw, a light beam angle of said headlamp being adjusted by turning said horizontal and vertical aiming screws so that said tilting member is horizontally and vertically tilted with respect to said reference member, said vehicular headlamp assembly comprising a tilt measuring device for measuring an amount of tilt of said tilting member in said horizontal direction, said tilt measuring device protruding rearward of the reference member and the reference member, and said tilt measuring device comprising:

a fixed holder fixed to said reference member and covering at least a portion of a protruding portion of said horizontal aiming screw protruding rearward of said reference member, an elongated groove being formed in said fixed holder extending parallel to said horizontal aiming screw;

a nut holder slidable along said elongated groove, said nut holder having a portion protruding through said elongated groove;

a sliding nut received in said nut holder and being longitudinally slidable relative to said nut holder, said sliding nut threadedly engaging said protruding portion of said horizontal aiming screw;

a scale for indicating an amount of displacement of said nut holder relative to said fixed holder, said scale being provided adjacent a portion of said nut holder exposed through said elongated groove of said fixed holder; and a zero-adjustment screw threadedly engaged with a female screw part of said nut holder and with a female part of said sliding nut, said female screw part of said nut holder and said female part of said sliding nut being formed in a slide path of said nut holder and said sliding nut, wherein, when said zero-adjustment screw is turned, said nut holder is slid along said elongated groove of said fixed holder.

5. The vehicular headlamp assembly according to claim 4, wherein said reference member is a lamp body, and said tilting member is a reflector tiltably mounted within said lamp body.

6. The vehicular headlamp assembly according to claim 4, wherein said reference member is a lamp housing, and said tilting member is a lamp body/reflector unit formed integrally with an inner spherical surface of said lamp body.

7. The vehicular headlamp assembly according to claim 4, wherein said nut holder comprises a pair of opposing legs with stepped parts being formed on an inner wall of each of said legs, and wherein said sliding nut comprises a pair of guide parts slanting downward and outward on opposing sides thereof, said guide parts slidably resting on said stepped parts formed on said inner wall of said pair of legs of said nut holder.

8. The vehicular headlamp assembly according to claim 4, wherein said female screw part of said nut holder is formed in a screw receiving groove formed in said portion of said nut holder protruding through said elongated groove.

9. The vehicular headlamp assembly according to claim 4, wherein a pitch of said zero-adjustment screw is smaller than a pitch of said horizontal adjustment screw.

10. The vehicular headlamp assembly according to claim 4, wherein said portion of said nut holder protruding through said elongated groove is trapezoidal in cross section.

11. The vehicular headlamp assembly according to claim 10, wherein a pair of cursors are marked on opposing sides of said portion of said nut holder protruding through said elongated groove for providing an indication on said scale.

12. The vehicular headlamp assembly according to claim 4, wherein said sliding nut comprises a first female threaded part formed between opposing legs of said sliding nut for engaging said horizontal aiming screw, and a second female threaded part protruding from a top of said sliding nut for engaging said zero-adjustment screw.

13. The vehicular headlamp assembly according to claim 12, wherein an outwardly extending urging arm is formed on ends of bottom portions of each of said legs of said sliding nut.

14. The vehicular headlamp assembly according to claim 13, wherein each of said urging arms has a downwardly extending projection formed on a lower side thereof, each said projection contacting a flange-like nut slide surface of said nut holder.

15. The vehicular headlamp assembly according to claim 13, wherein depressions for receiving said projections are formed in end portions of said flange-like slide surfaces.

16. A vehicular headlamp assembly of a tilting member type in which a tilting member including a reflecting surface is supported on a reference member by a pivot, a horizontal aiming screw, and a vertical aiming screw, a light beam angle of said headlamp being adjusted by turning said horizontal and vertical aiming screws so that said tilting member is horizontally and vertically tilted with respect to said reference member, said vehicular headlamp assembly comprising a tilt measuring device for measuring an amount of tilt of said tilting member in said horizontal direction, said tilt measuring device protruding rearward of and the reference member, and said tilt measuring device comprising:
- a fixed holder fixed to said reference member and covering at least a portion of a protruding portion of said horizontal aiming screw protruding rearward of said reference member, an elongated groove being foraged in said fixed holder extending parallel to said horizontal aiming screw;
- a sliding nut slidable along said elongated groove, said sliding nut threadedly engaging said protruding portion of said horizontal aiming screw, said sliding nut having an upwardly protruding portion slidably received in said elongated groove;
- a scale for indicating an amount of displacement of said sliding nut relative to said fixed holder provided on a surface of said upwardly protruding portion of said sliding nut, said scale being exposed through said elongated groove; and
- a cover fastened to said fixed holder, said cover having a cursor formed thereon for providing an indication on said scale.

17. The vehicular headlamp assembly according to claim 16, wherein said cover is generally U-shaped in cross section and has a window formed therein at a location corresponding to said elongated groove formed in said fixed holder, said cursor comprising an arrow-shaped portion protruding into said window from an edge of said window.

18. The vehicular headlamp assembly according to claim 17, wherein an elongated hole is formed in said cover extending parallel to said elongated groove, and further comprising a fixing screw passing through said elongated hole for fastening said cover to said fixed holder.

19. The vehicular headlamp assembly according to claim 18, wherein said cover has a pawl on a lower edge thereof, said pawl having a pair of slide projections rosined thereon, said slide projections being slidable along a lower edge portion of said fixed holder when said fixing screw is loosened to allow said cover to slide relative to said fixed holder.

20. The vehicular headlamp assembly according to claim 16, wherein said sliding nut is generally U-shaped in cross section having a pair of legs on opposing sides of said horizontal adjustment screw, engaging projections projecting downward being formed on lower ends of said legs.

21. The vehicular headlamp assembly according to claim 16, wherein said reference member is a lamp body, and said tilting member is a reflector tiltably mounted within said lamp body.

22. The vehicular headlamp assembly according to claim 16, wherein said reference member is a lamp housing, and said tilting member is a lamp body/reflector unit formed integrally with an inner spherical surface of said lamp body.

23. A vehicular headlamp assembly of a tilting member type in which a tilting member including a reflecting surface is supported on a reference men%bet by a pivot, a horizontal aiming screw, and a vertical aiming screw, a light beam angle of said headlamp being adjusted by turning said horizontal and vertical aiming screws so that said tilting member is horizontally and vertically tilted with respect to said reference member, said vehicular headlamp assembly comprising a tilt measuring device for measuring an amount of tilt of said tilting member in said horizontal direction, said tilt measuring device protruding rearward of the and the reference member, and said tilt measuring device comprising:
- a fixed holder fixed to said reference member and covering at least a portion of a protruding portion of said horizontal aiming screw protruding rearward of said reference member, an elongated groove being formed in said fixed holder extending parallel to said horizontal aiming screw;
- a sliding nut slidable along said elongated groove, said sliding nut threadedly engaging said protruding portion of said horizontal aiming screw, said sliding nut having an upwardly protruding portion slidably received in said elongated groove;
- a scale for indicating an amount of displacement of said sliding nut relative to said fixed holder provided on a surface of said fixed member adjacent said elongated groove; and
- a slide cursor fixed to said portion of said sliding nut protruding through said elongated groove, said slide cursor having a cursor pointer for providing an indication on said scale.

24. The vehicular headlamp assembly according to claim 23, wherein slide cursor has an elongated hole formed therein, and further comprising a fixing screw for fastening said slide cursor to said portion of said sliding nut protruding through said elongated groove, said fixing screw passing through said elongated hole.

25. The vehicular headlamp assembly according to claim 24, wherein outwardly extending slide guides are provided on bottom side edges of said slide cursor, said slide guides sliding on flat, opening edge portions stepped down from flange portions of said fixed holder.

26. The vehicular headlamp assembly according to claim 23, wherein said portion of said sliding nut protruding through said elongated groove has a narrowed part engaging edges of said elongated groove.

27. The vehicular headlamp according to claim 23, wherein a portion of said sliding nut engaging said horizontal adjustment screw is generally U-shaped in cross section having a pair of legs on opposing sides of said horizontal adjustment screw, and further comprising a pair of arms outwardly extending from a bottom end of each of said legs, each of said arms having an arcuate slide projection slidably engaging a flange portion of said fixed holder.

* * * * *